Patented Dec. 9, 1924.

1,518,665

UNITED STATES PATENT OFFICE.

BERTRAM MAYER, WILHELM MOSER, AND JAKOB WÜRGLER, OF BASEL, SWITZERLAND, ASSIGNORS TO SOCIETY OF CHEMICAL INDUSTRY IN BASLE, OF BASEL, SWITZERLAND.

VAT DYESTUFF DERIVED FROM ANTHRAQUINONE AND PROCESS OF MAKING SAME.

No Drawing. Application filed May 25, 1923. Serial No. 641,508.

*To all whom it may concern:*

Be it known that we, BERTRAM MAYER, citizen of the Swiss Republic, WILHELM MOSER, citizen of the German Republic, and JAKOB WÜRGLER, citizen of the Swiss Republic, all three residing at Basel, Switzerland, have invented new and useful Vat Dyestuffs Derived from Anthraquinone and Process of Making Same, of which the following is a full, clear, and exact specification.

This invention relates to an improvement in or modification of that described in Patent 1,436,770 of November 28th, 1922. According to that invention a derivative of betanaphthoquinone containing removable substituents is caused to react with an alpha-aminoanthraquinone compound, and condensing the resulting product of condensation with an orthodiaminoanthraquinone.

In the course of further investigations it has been found that in the first phase of this reaction the alpha-aminoanthraquinone is always fixed only in the 4-position of the 1-2-naphthoquinone, whether an interchangeable substituent may or may not be in this 4-position. Contrarily to the statements of the aforesaid patent, there are produced intermediate products of the formula—

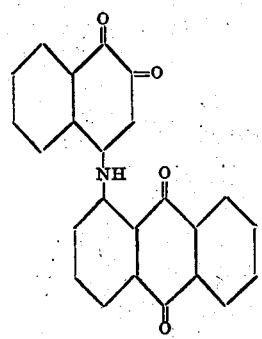

or

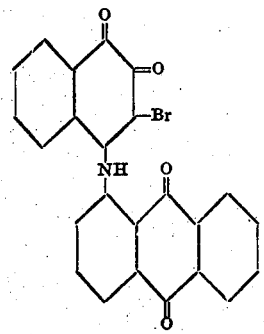

or

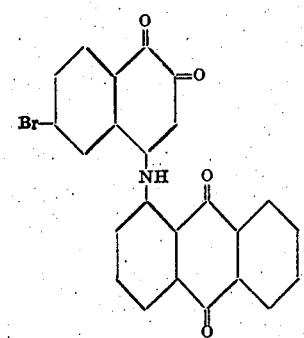

which are then condensed in the second phase with orthodiaminoanthraquinones to the corresponding quinoxalines.

According to the present invention the derivative of betanaphthoquinone which contains a mobile substituent is first condensed with the orthodiaminoanthraquinone and the product is then caused to react with the mono- or di-alphaaminoanthraquinone, new dyestuffs being obtained. The constitution of these dyestuffs, as in the case of the products of the aforesaid invention, is probably characterized by the presence of anthraquinone-betanaphthazine complexes united by an >N—H group to an anthraquinone nucleus, one of the nitrogen valences being fixed contrarily to the dyestuffs obtainable according to Patent 1,436,770 in any position of the naphtalene nucleus of the anthraquinone-betanaphthazine, and the other in an alpha-position of the second anthraquinone nucleus. The said dyestuffs constitute dark red-brown powders and are identical with the products of the aforesaid patent, if they have been obtained by means of a product of substitution of the 1.2-naphthoquinone, which carried its interchangeable substituent in the 4-position, while, if this should not be the case, they are sharply differentiated therefrom by the fact that they dissolve in concentrated sulfuric acid to brown solutions; also that they yield with hydrosulfite and caustic soda a brown vat dyestuff by means of which cotton may be dyed brown tints.

The following examples illustrate the invention, without limiting it, the parts being by weight:—

*Example 1.*

18 parts of 6-bromo-1:2-naphthoquinone and 15 parts of 2:3-diaminoanthraquinone are introduced into 180 parts of glacial acetic acid and the mixture is slowly heated, while continuously stirring, to 90—100° C. The mixture is kept at this temperature while continuing the stirring until the reaction is finished; it is then allowed to cool and filtered; the residue is copiously washed with hot water and dried. There is thus obtained a greenish-yellow powder which dissolves in concentrated sulfuric acid to a bluish-violet solution.

A mixture of 9 parts of this product, 6 parts of alphaaminoanthraquinone, 6 parts of anhydrous sodium acetate, 0.5 part of anhydrous cupric chloride and 300 parts of nitrobenzene is boiled for 16 hours in a reflux apparatus. After cooling the solid matter is suction-filtered, washed successively with alcohol, with dilute hydrochloric acid and with hot water, and is then dried.

The dyestuff thus obtained is a brown-red powder which dissolves with great difficulty in nitrobenzene, yielding a red solution. It dissolves in concentrated sulfuric acid to a brown solution which when diluted with water yields a flocculent red precipitate. The new dyestuff yields with hydrosulfite and caustic soda a brown vat which dyes cotton strong reddish-brown tints of excellent fastness.

By substituting in this example 1:5-diaminoanthraquinone for alphaaminoanthraquinone there is obtained a product which is a little more bluish while the use of 1:2-diaminoanthraquinone in place of 2:3-diaminoanthraquinone leads to a violet brown.

*Example 2.*

18 parts of 3-bromo-1:2-naphthoquinone and 15 parts of 2:3-diaminoanthraquinone are introduced into 180 parts of glacial acetic acid and the mixture is heated slowly while continuously stirring to 90—100° C. The mixture is kept at this temperature, while stirring, until the reaction is finished. It is then allowed to cool and filtered; the solid matter is washed copiously with hot water and dried. There is thus obtained a greenish-yellow powder which dissolves in concentrated sulfuric acid to a red solution.

A mixture of 9 parts of this product, 6 parts of alphaaminoanthraquinone, 6 parts of anhydrous sodium acetate, 0.5 part of cupric chloride and 300 parts of nitrobenzene is boiled for 16 hours in a reflux apparatus; after cooling the solid matter is suction-filtered, washed successively with alcohol, with dilute hydrochloric acid and with hot water, and is then dried.

The new dyestuff is a bluish-red powder which dissolves in concentrated sulfuric acid to a reddish-brown solution, from which the addition of water precipitates the dyestuff in reddish black flocks. It yields with hydrosulfite and caustic soda a red-brown vat, which dyes cotton greyish-brown tints of excellent fastness.

By substituting 1:5-diaminoanthraquinone for alphaaminoanthraquinone in this example an analogous product is obtained.

The U. S. Patent 1,436,770 describes a process consisting in treating in a first phase a derivative of the 1.2-naphthoquinone, which still contains in the naphtalene nucleus an interchangeable substituent, with an alphaaminoanthraquinone and in condensing thereupon the obtained product with an ortho-diaminoanthraquinone.

It was supposed at that time that in the first phase the interchangeable substituent would be replaced by the radical of alphaaminoanthraquinone, according to the following formulæ:

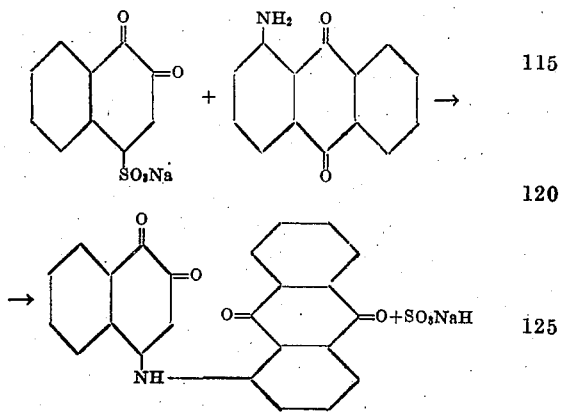

or

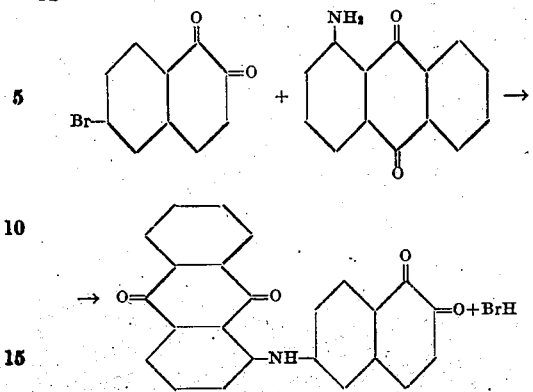

Applicant's further investigations, however, have proved that this supposition was correct in the case of the 1.2-naphthoquinone-4-sulfonic acid, but they show also that in the case of the 6-bromo-1.2-naphthoquinone or of the 3-bromo-1.2-naphthoquinone the reaction takes place according to the following formula:

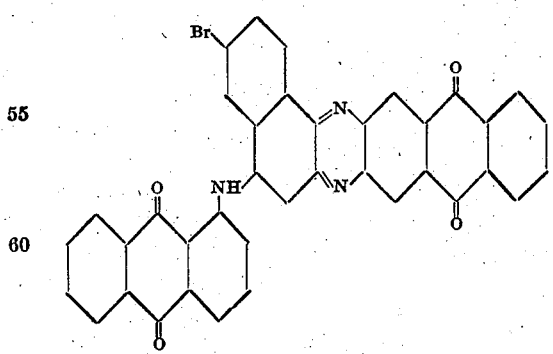

(whereby the oxygen is furnished on the expense of a part of the naphthoquinone present, this reaction being, as is well known, characteristic for quinones). If this intermediate product is condensed with an ortho-diaminoanthraquinone, for example with the 2.3-diaminoanthraquinone, there is obtained a bromo-containing dyestuff of the following constitution:

It results therefrom that all the final dyestuffs of Patent 1,436,770 are characterized by the common atomic grouping:

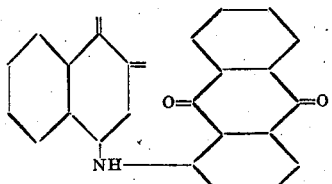

Now, if the reaction on 6-bromo-1.2-naphthoquinone is performed not with the alpha-aminoanthraquinone, but with the ortho-diaminoanthraquinone, the naphthoquinone is caused to react as ortho-diketone under formation of a quinoxaline in the following manner:

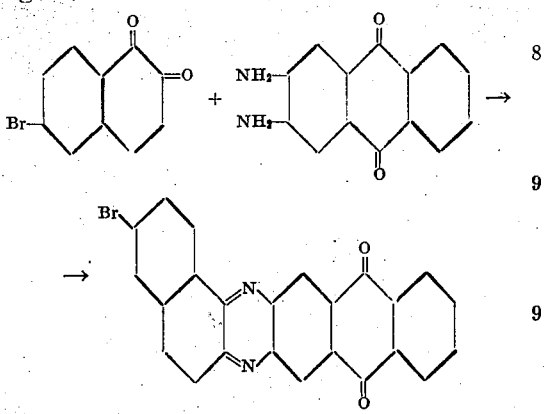

When the thus obtained intermediate product is condensed with alpha-aminoanthraquinone, there results, contrarily to the product of the process of Patent 1,436,770, a dyestuff free from bromine, which no more dyes the cotton red tints, but which yields a brown tint; this dyestuff corresponds to the following constitution:

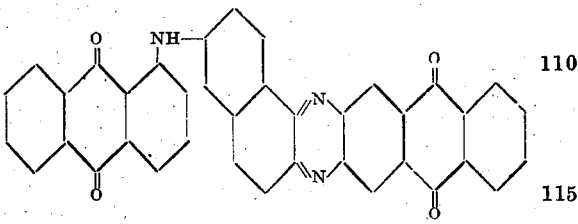

What we claim is:
1. The herein described process for the manufacture of new vat dyestuffs derived from anthraquinone, consisting in condensing the derivatives of betanaphthoquinone containing mobile substituents with 1 molecular proportion of an orthodiaminoanthraquinone, then causing the compound thus formed to react with an alphaaminoanthraquinone.
2. The herein described process for the manufacture of new vat dyestuffs derived from anthraquinone, consisting in condensing the derivatives of betanaphthoquinone containing mobile substituents in a position other than the 4-position with 1 molecular proportion of an orthodiaminoanthraquinone, then causing the compound thus formed to react with a mono-alphaaminoanthraquinone.

3. The herein described process for the manufacture of new vat dyestuffs derived from anthraquinone, consisting in condensing the derivatives of betanaphthoquinone containing mobile substituents in a position other than the 4-position with 1 molecular proportion of 2:3-diaminoanthraquinone, then causing the compound thus formed to react with a mono-alphaaminoanthraquinone.

4. The herein described process for the manufacture of new vat dyestuffs derived from anthraquinone, consisting in condensing the 6-bromo-1:2-naphthoquinone with 1 molecular proportion of 2:3-diaminoanthraquinone, then causing the compound thus formed to react with a mono-alphaaminoanthraquinone.

5. The herein described process for the manufacture of a new vat dyestuff derived from anthraquinone, consisting in condensing the 6-bromo-1:2-naphthoquinone with 1 molecular proportion of 2:3-diaminoanthraquinone, then causing the compound thus formed to react with alphaaminoanthraquinone.

6. The herein described new vat dyestuffs resulting from the action of alphaaminoanthraquinones on the products of condensation of an orthodiaminoanthraquinone with a betanaphthoquinone containing mobile substituents in a position other than the 4-position, dyestuffs whose constitution is probably characterized by the presence of anthraquinone-beta-naphthazine complexes united by an >N—H group to an anthraquinone nucleus, one of the nitrogen valences being fixed in any position which is different from the 4-position of the naphthalene nucleus of the anthraquinone-beta-naphthazine, and the other in an alpha-position of the second anthraquinone nucleus, the said dyestuffs constituting dark red-brown powders, insoluble in water, soluble in concentrated sulfuric acid to brown solutions, yielding with hydrosulfite and caustic soda brown vats which dye cotton strong and fast tints varying from reddish-brown to violet-brown.

7. The herein described new vat dyestuffs resulting from the action of a mono-alpha-aminoanthraquinone on the products of condensation of an orthodiaminoanthraquinone with a betanaphthoquinone containing mobile substituents in a position other than the 4-position, dyestuffs whose constitution is probably characterized by the presence of an anthraquinone-beta-naphthazine complex united by an >N—H group to an anthraquinone nucleus, one of the nitrogen valences being fixed in any position which is different from the 4-position of the naphthalene nucleus of the anthraquinone-beta-naphthazine, and the other in an alpha-position of the second anthraquinone nucleus, the said dyestuffs constituting dark red-brown powders, insoluble in water, soluble in concentrated sulfuric acid to brown solutions, yielding with hydrosulfite and caustic soda brown vats which dye cotton strong and fast tints varying from reddish-brown to violet-brown.

8. The herein described new vat dyestuffs resulting from the action of a mono-alpha-aminoanthraquinone on the products of condensation of the 2:3-diaminoanthraquinone with a betanaphthoquinone containing mobile substituents in a position other than the 4-position, dyestuffs whose constitution is probably characterized by the presence of an anthraquinone-beta-naphthazine complex united by an >N—H group to an anthraquinone nucleus, one of the nitrogen valences being fixed in any position which is different from the 4-position of the naphthalene nucleus of the anthraquinone-beta-naphthazine, and the other in an alpha-position of the second anthraquinone nucleus, the said dyestuffs constituting dark red-brown powders, insoluble in water, soluble in concentrated sulfuric acid to brown solutions, yielding with hydrosulfite and caustic soda brown vats which dye cotton strong and fast tints varying from reddish-brown to violet-brown.

9. The herein described new vat dyestuffs resulting from the action of a mono-alpha-aminoanthraquinone on the product of condensation of the 2:3-diaminoanthraquinone with the 6-bromo-1:2-naphthoquinone, dyestuffs whose constitution is probably characterized by the presence of an anthraquinone-beta-naphthazine complex united by an >N—H group to an anthraquinone nucleus, one of the nitrogen valences being fixed in the 6-position of the naphthalene nucleus of the anthraquinone-beta-naphthazine, and the other in an alpha-position of the second anthraquinone nucleus, the said dyestuffs constituting dark red-brown powders, insoluble in water, soluble in concentrated sulfuric acid to brown solutions, yielding with hydrosulfite and caustic soda brown vats which dye cotton strong and fast reddish-brown tints.

10. The herein described new vat dyestuff resulting from the action of the alpha-aminoanthraquinone on the product of condensation of the 2:3-diaminoanthraquinone with the 6-bromo-1:2-naphthoquinone, a dyestuff the constitution of which is probably characterized by the presence of an anthraquinone-beta-naphthazine complex united by an >N—H group to an anthraquinone nucleus, one of the nitrogen valences being fixed in the 6-position of the naphthalene nucleus of the anthraquinone-beta-naphthazine, and the other in alpha-position of the second anthraquinone nucleus, the said dyestuffs constituting a dark red-brown powder, insoluble in water, soluble in concentrated sulfuric acid to a brown solution, yielding with hydrosulfite and caustic soda a brown vat which dyes cotton strong and fast reddish-brown tints.

In witness whereof we have hereunto signed our names this 7th day of May 1923. in the presence of two subscribing witnesses.

BERTRAM MAYER.
WILHELM MOSER.
JAKOB WÜRGLER.

Witnesses:
AMAND BROWN,
LUCIEN PICARD.